United States Patent
Gomes et al.

(10) Patent No.: US 12,020,240 B2
(45) Date of Patent: Jun. 25, 2024

(54) RULE-BASED TOKEN SERVICE PROVIDER

(71) Applicant: PAYPAL, INC., San Jose, CA (US)

(72) Inventors: Dinesh Agnello Gomes, San Jose, CA (US); Ashwini Vishwanath, San Jose, CA (US); Vyomesh Sharma, San Jose, CA (US); Nitin Prabhu, San Jose, CA (US)

(73) Assignee: PayPal, Inc., San Jose, CA (US)

( * ) Notice: Subject to any disclaimer, the term of this patent is extended or adjusted under 35 U.S.C. 154(b) by 194 days.

(21) Appl. No.: 17/498,640

(22) Filed: Oct. 11, 2021

(65) Prior Publication Data
US 2022/0058644 A1 Feb. 24, 2022

Related U.S. Application Data

(63) Continuation of application No. 16/137,481, filed on Sep. 20, 2018, now Pat. No. 11,144,914.

(51) Int. Cl.
*G06Q 20/38* (2012.01)
*G06Q 20/32* (2012.01)
*G06Q 20/40* (2012.01)

(52) U.S. Cl.
CPC ....... *G06Q 20/38215* (2013.01); *G06Q 20/32* (2013.01); *G06Q 20/3821* (2013.01); *G06Q 20/405* (2013.01); *G06Q 2220/00* (2013.01)

(58) Field of Classification Search
CPC .. G06Q 20/32; G06Q 20/3821; G06Q 20/405; G06Q 2220/00; G06Q 20/38215
See application file for complete search history.

(56) References Cited

U.S. PATENT DOCUMENTS

| | | | |
|---|---|---|---|
| 9,195,984 B1* | 11/2015 | Spector et al. | |
| 2008/0223918 A1* | 9/2008 | William et al. | |
| 2014/0244500 A1* | 8/2014 | Elias | |
| 2015/0112870 A1* | 4/2015 | Nagasundaram et al. | |
| 2015/0112871 A1* | 4/2015 | Kumnick | |
| 2015/0254664 A1* | 9/2015 | Bondesen et al. | |
| 2017/0053258 A1* | 2/2017 | Nagasundaram et al. | |
| 2017/0061428 A1* | 3/2017 | Prabhu et al. | |
| 2017/0063840 A1* | 3/2017 | Krishnaiah | |
| 2017/0262842 A1* | 9/2017 | Subbarayan et al. | |
| 2019/0228410 A1* | 7/2019 | Patel et al. | |
| 2019/0260732 A1* | 8/2019 | Narayan et al. | |
| 2022/0122061 A1* | 4/2022 | Musil et al. | |

OTHER PUBLICATIONS

EMV Payment Tokenisation Specification (Year: 2014).*
"EMV® * Payment Tokenisation Specification—Technical Framework", EMVCo, LLC, Version 1.0, Mar. 2014, 84 pages.

* cited by examiner

*Primary Examiner* — Neha Patel
*Assistant Examiner* — Yin Y Choi
(74) *Attorney, Agent, or Firm* — Haynes and Boone, LLP

(57) ABSTRACT

Methods and systems are provided to receive token context data from a token request, determine parameters of a custom token, and generate and communicate the custom token. Tokens may be generated that are compatible with one or more payment providers from a plurality of possible payment providers. Data related to current and future conditions of the payment providers, merchant preferences, customer preferences, locations of the merchant, customer, and/or the transaction, and regulatory rules may be used to select the payment provider.

20 Claims, 12 Drawing Sheets

RULE-BASED TOKEN SERVICE PROVIDER

CROSS REFERENCE TO RELATED APPLICATION

This application is a continuation of U.S. patent application Ser. No. 16/137,481 filed on Sep. 20, 2018 which issued as U.S. patent Ser. No. 11/144,914 on Oct. 12, 2021, the contents of which are hereby incorporated by reference in their entirety for all purposes.

BACKGROUND

Field of the Invention

The present invention generally relates to transaction tokens, and more particularly to generation and communication of such tokens.

Related Art

Electronic tokens are increasingly utilized for a variety of uses. For example, electronic tokens can be used during payment transactions, with providers such as Visa®, MasterCard®, American Express®, Discover®, and other providers each utilizing electronic tokens of their own specifications. However, such electronic tokens are customized for each specific provider and require a party to the transaction to identify the provider and request a token from the provider. In such instances, individual parties may not correctly identify the best provider for the transaction, and in fact may request tokens that ultimately may not even be usable for their transaction. Furthermore, even if the correct token is requested, the tokens cannot be shared between networks of the providers, limiting flexibility.

Figure 1A:
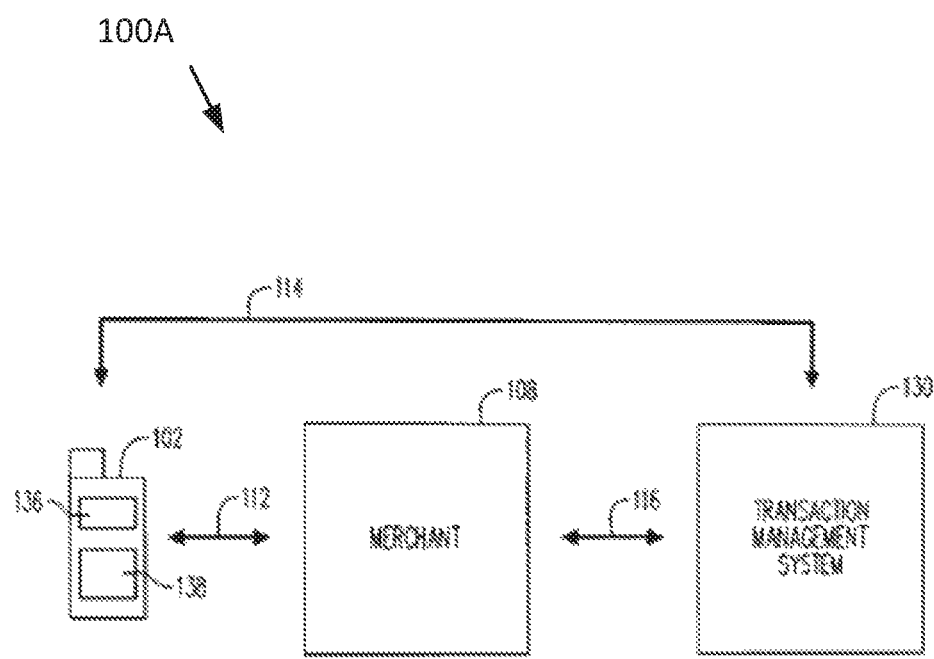
FIG. 1A is a schematic diagram showing a system according to an embodiment of the disclosure.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The present disclosure describes systems and methods that allow a customer or merchant to request a token from a token service provider without specifying certain details related to the token (e.g., the identity of the payment or token provider). The token service provider may then determine parameters of the token from the request, determine an appropriate token provider, generate a token that meets the parameters and is configured for processing on the appropriate networks of the token provider, and communicate the token to the customer or merchant. The token service provider may additionally process the token or a transaction that uses the token.

Thus, the present disclosure is directed towards systems and techniques that can be utilized for an application programming interface (API) for tokenization. Such systems and techniques can determine appropriate tokens for users and provide such tokens. Such systems and techniques may supplement or complement complicated network systems, where each network system is dedicated to serving a token for a specific payment provider, and instead utilize a system that can provide a plurality of different types of tokens. Thus, memory and processing usage can be reduced through the token service provider described herein.

As described herein, and in the interest of clarity, "payment provider" may prefer to the token provider. Such a payment provider may include networks configured to process tokenized transactions. Each payment provider (e.g., Visa®, MasterCard®, American Express®, Discover®, or another payment provider) may require tokens with unique aspects and, thus, tokens of one payment provider may not be compatible with networks of another payment provider.

In certain embodiments, a token serves as a proxy for conveying consent (e.g., of the customer and/or the merchant) for a particular transaction or as proxies for financial instruments or payment accounts. The transaction may be financial or non-financial. For the purposes of this disclosure, tokens may include any physical or electronic token used in transactions. Tokens may, for example, include embedded information. Certain tokens may include a code (e.g., alphanumeric code) or representation (e.g., barcode or picture) that contains information directed to the transaction (e.g., may include information identifying the customer, the transaction, the merchant, the issuer, a location of the transactions, a transaction amount, and/or other information).

Furthermore, tokens may include open loop and closed loop tokens. "Open loop" may mean that the token is sufficiently recognizable to be mutable by one or more existing routing networks (e.g., credit card networks such as Visa®, MasterCard®, Discover®, or another payment provider). Open loop tokens may ultimately route payment back to a third party payment provider (e.g., PayPal®) or another appropriate payment provider based on the context of the transaction. "Closed loop" may mean that the token is only recognizable by a limited ecosystem (e.g., only recognized by a third party such as PayPal®). While such closed loop tokens may ultimately be used to process payment through a payment provider, the third party receives and processes the token. Thus, for transactions utilizing closed loop tokens, the third party receives the token, determines the validity of the token, determines details of the token (e.g., that payment should be charged to a credit card account of a specific credit card company), and processes the transaction according to the details of the token (e.g., by charging the specified credit card account).

Traditionally, the customer or merchant requests a token from a specific payment provider. The customer or merchant is thus required to affirmatively identify the payment provider and communicate with the payment provider to request a token. However, the customer or merchant may not identify the optimal payment provider (e.g., the payment provider that provides tokens allowing for the lowest cost or fastest service) or may incorrectly identify a payment provider (e.g., the customer may be in a country different from the customer's country of residence and may identify a payment provider that does not conform with regulations of the country).

The present disclosure allows for a customer or merchant to request a token and utilize the token in a transaction without affirmatively identifying the payment provider. The techniques and systems of the present disclosure may then determine a token appropriate for the transaction from the request. For example, the payment provider may be selected and a token compatible with the payment provider may be generated and communicated to the customer or the merchant.

In certain embodiments, the systems and techniques of the present disclosure allow for improvements in the operation of computer systems. For example, the systems and techniques of the present disclosure may allow for conservation of processing resources by determining an optimal token utilizing data and preferences from a variety of sources instead of having various different tokens generated and/or attempting to use different tokens. As the transaction management system may be in communication with payment providers, store merchant and customer preferences, and receive data from networks of the payment providers, the custom token provided may increase transaction processing speeds, increase points accumulation to the merchant and/or customer, or decrease costs. Furthermore, as the transaction management system may receive payment provider network information, the custom token may be configured to utilize the optimal routing path for any given point in time and may thus decrease network processing load and/or increase routing speeds. Additionally, in certain embodiments, the token generated may include data allowing for transaction processing by a plurality of payment providers, networks, or routing paths depending on network availability. Such tokens may further improve the operation and speed of payment networks and allow for greater flexibility by, for example, generating a token that can be optimized for various different areas that require different characteristics for optimal processing.

FIG. 1A is a schematic diagram showing a system according to an embodiment of the disclosure. FIG. 1A illustrates system 100 pursuant to certain embodiments. As shown, a user or operator may have or use a user device 102 (such as a smartphone, laptop computer, desktop computer, wearable device, smart home device, or other such device). The user device 102 has a display screen 136 and a data entry device 138 (such as a keypad or touch screen). Pursuant to embodiments of the present invention, the customer may use the user device 102 to conduct transactions or other actions (e.g., payment transactions, authentication transactions, entry into certain areas). In certain such embodiments, the user device 102 may interact with merchant 108 or a merchant device associated with merchant 108 via connection 112, which may be a wired or wireless connection (e.g., through wired internet connections or wireless connections such as WiFi, Bluetooth, NFC, or another such connection).

The user device 102 and/or the merchant 108 may communicate a request for a token ("token request") to transaction management system 130. The token request may include information identifying one or more of the user, the merchant, details of the transaction, the location of the user, the merchant, or both, or other information related to the transaction. In certain embodiments, the transaction management system may be configured to select a token provider or issuer (e.g., a payment provider that issues tokens for transactions, such as a credit card provider, a digital payment provider, a digital wallet, or another such issuer), generate a token that can be used in transactions with the issuer (e.g., can be used to conduct payment transactions with the payment service of the issuer), and communicate the token to the user device 102, the merchant 108, or a merchant device associated with the merchant 108.

The transaction management system 130 may receive the token request. In certain embodiments, the transaction management system 130 includes a rules engine. The rules engine may include regulatory rules, user preferences, merchant rules, business rules, and/or other pre-set rules used to select and/or determine parameters of a token provided to the user device 102, the merchant 108, and/or a device associated with merchant 108. In certain embodiments, the token request may not identify a specific token issuer or payment provider associated with the token. The transaction management system 130 may, from the token request, determine one or more parameters of the token to be generated. Furthermore, the transaction management system 130 may select the specific token issuer or payment provider associated with the token for the generated token.

The transaction management system 130 may then generate the token that can be used with the specific token issuer or payment provider and communicate the token to the user device 102, the merchant 108, or a merchant device associated with merchant 108. In certain situations, the transaction management system may receive the token request and communicate the generated token via communication paths 114 or 166 (e.g., via a wired, wireless, cellular, or other type of network) to user device 102 or merchant 108, respectively.

Although the system depicted in FIG. 1A (and elsewhere throughout this disclosure) shows only a single user device 102, merchant 108 and transaction management system 130, those skilled in the art will appreciate that there may be a number of devices in use, a number of merchants and devices and networks using the system, and potentially multiple instances of the transaction management system in operation.

Figure 1B:
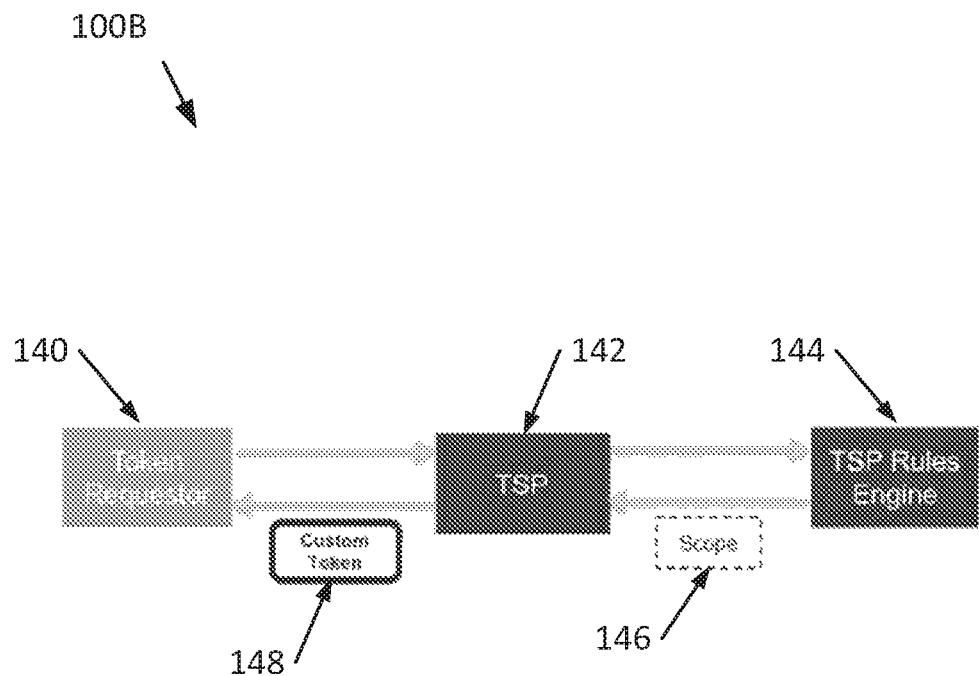
FIG. 1B is a schematic diagram showing a rule-based token service provider system according to an embodiment of the disclosure.

FIG. 1B is a schematic diagram showing a rule-based token service provider system according to an embodiment of the disclosure. The system of FIG. 1B includes token requestor 140, token service provider ("TSP") 142, and TSP rules engine 144. Token requestor 140 may be a user of an electronic device (e.g., a customer device used for a transaction) or the user device, a merchant, a device associated with the merchant, or another party associated with the transaction. Token requestor 140 may communicate a token request to TSP 142. As described herein, elements of FIG. 1B (e.g., TSP 142 and/or TSP rules engine 144) can be a part of transaction management system 130 or can be separate from transaction management system 130.

TSP 142 may receive the token request. In certain embodiments, after receiving the token request, the TSP 142 may access rules stored within TSP rules engine 144 and/or communicate the token request to TSP rules engine 144. The rules may be pre-determined (e.g., pre-set by the merchant and/or the user or pre-programmed) and may be stored within database structures of TSP rules engine 144.

The rules and/or TSP rules engine 144 may be used to determine a scope or parameters of the token. Determining the scope or parameters may include determining identities of eligible token issuers, a minimum, maximum, or required period of validity for the token, a minimum, maximum, or required transaction amount associated with the token, suitable encryption schemes for the token, possible payment routing paths, whether any geo-fencing is required and details of the geo-fencing if needed, items or item categories for the transaction that the token is associated with, loyalty points that would benefit the customer/user or the merchant, other customer/user or merchant preferences, current location of the user/customer or merchant, and/or other factors of the transaction.

After the scope or parameters of the token has been determined, TSP 142 may then determine details of the actual token and generate the token. For example, TSP 142 may, using the scope or parameters of the token, determine a token issuer for the token (e.g., a payment provider such as Visa®, MasterCard®, or another payment provider), a payment routing path, a period of validity for the token, geo-fenced area of the token, encryption schemes such as cryptogram techniques, and other details of the token. Custom token 148 may then be generated by TSP 142 according to the details and communicated to token requester 140 for use in the transaction.

Figure 2:
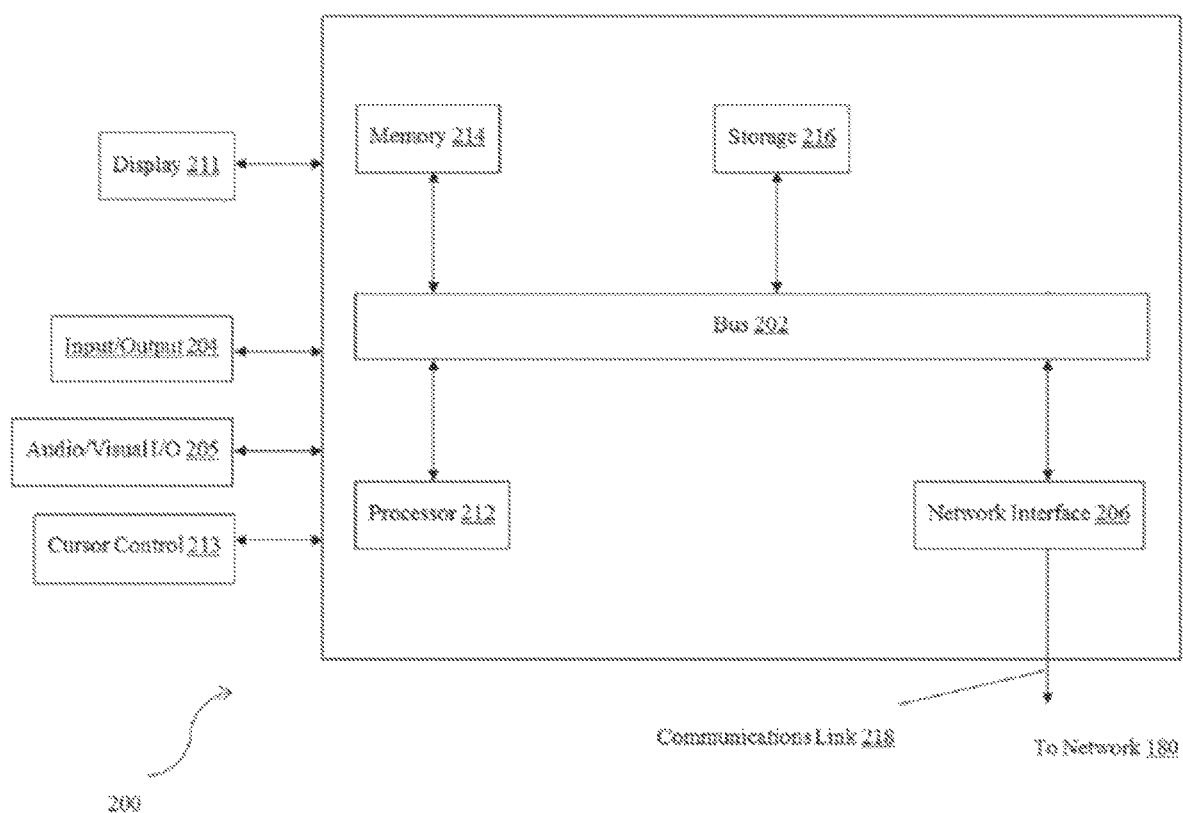
FIG. 2 is a block diagram showing an example system according to an embodiment of the disclosure.

FIG. 2 is a block diagram showing an example system according to an embodiment of the disclosure. In various embodiments, the electronic device may be a computing device (e.g., smart phone, a computing tablet, a personal computer, laptop, a wearable computing device such as glasses or a watch, Bluetooth device, key FOB, badge, etc.) configured to request a token or a transaction management device configured to receive a token request and provide the token. The electronic device of FIG. 2 may utilize a network computing device (e.g., a network server) and communicate the token request and/or the token over the network. It should be appreciated that each of the devices utilized by users, merchants, token issuers, or other parties may be implemented as electronic device 200 in a manner as follows.

Electronic device 200 includes a bus 202 or other communication mechanism for communicating information data, signals, and information between various components of electronic device 200. Components include an input/output (I/O) component 204 that can be used to detect and/or emit waves. I/O component 204, which may be comprised of multiple devices, may also include an output component, such as a display 211 and a cursor control 213 (such as a keyboard, keypad, mouse, etc.). An optional audio input/output component 205 may also be included to allow a user to use voice for inputting information by converting audio signals. Audio I/O component 205 may allow the user to hear audio. A transceiver or network interface 206 transmits and receives signals between electronic device 200 and other devices, such as another electronic device, service device, or a merchant server via network 180. In one embodiment, the transmission is through wired or wireless communications techniques, although other transmission mediums and methods may also be suitable. One or more processors 212, which can be a micro-controller, digital signal processor (DSP), or other processing component, processes these various signals, such as for display on electronic device 200 or transmission to other devices via a communication link 218. Processor(s) 212 may also control transmission of information, such as cookies or IP addresses, to other devices.

Components of electronic device 200 may also include a system memory component 214 (e.g., RAM), a static storage component 216 (e.g., ROM), and/or a disk drive 217. Electronic device 200 performs specific operations by processor(s) 212 and other components by executing one or more sequences of instructions contained in system memory component 214. Logic may be encoded in a computer readable medium, which may refer to any medium that participates in providing instructions to processor(s) 212 for execution. Such a medium may take many forms, including but not limited to, non-volatile media, volatile media, and transmission media. In various embodiments, non-volatile media includes optical or magnetic disks, volatile media includes dynamic memory, such as system memory component 214, and transmission media includes coaxial cables, copper wire, and fiber optics, including wires that comprise bus 202. In one embodiment, the logic is encoded in non-transitory computer readable medium. In one example, transmission media may take the form of acoustic or light waves, such as those generated during radio wave, optical, and infrared data communications.

Figure 3:
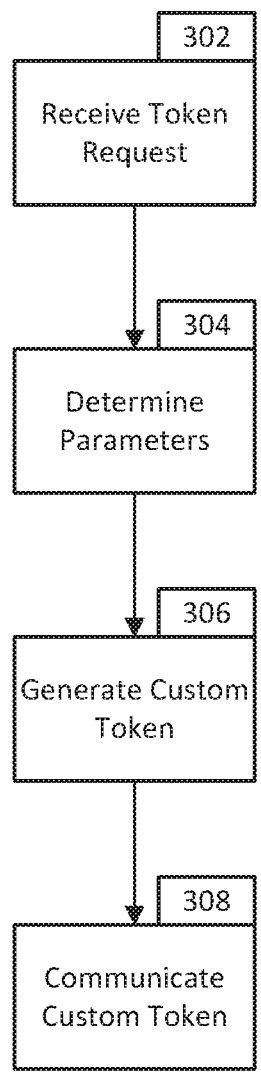
FIG. 3 is a flowchart showing an example of operations performed by a rule-based token service provider system according to an embodiment of the disclosure.

FIG. 3 is a flowchart showing an example of operations performed by a rule-based token service provider system according to an embodiment of the disclosure. In block 302, a token request may be received (e.g., by the transaction management system from a customer, user, or merchant). The token request may include token context data. Token context data may, thus, identify the information relevant to the transaction such as the location of the transaction, identity of the customer, identity of the merchant, items involved in the transaction, authentication required, and/or other information associated with the transaction.

The token management system may receive the token request and determine parameters of a token in block 304. Thus, for example, the type of token, any cryptogram protocols to be used, routing paths (e.g., for payment), geo-fencing, and other such parameters may be determined in block 304.

After the parameters have been determined in block 304, a custom token matching the parameters may be generated in block 306. In certain embodiments, the transaction management system may utilize the parameters determined in block 304 to determine characteristics of the custom token. Thus, for example, the transaction management system may include one or more pre-determined rule sets. A rule set may be selected and, utilizing the parameters determined in block 304, properties of the custom token may be determined and the custom token accordingly generated. The generated custom token may then be communicated in block 308 to, for example, a user or merchant device. The token may then be used in a transaction.

When processing the tokens, for open loop tokens, information derived from the token (e.g., by the merchant or customer) or the token itself may be communicated to the respective payment provider or a third party for processing of the transaction. For closed loop tokens, information derived from the token or the token itself may be communicated to the specific third party payment provider for processing. Closed loop tokens, while allowing for the benefits of being associated with one or more payment providers but configured to route payment to only a specific third party, may thus allow for more complex transaction processing while utilizing a single token instead of multiple tokens, increasing convenience and decreasing computer and network requirements.

Figure 4:
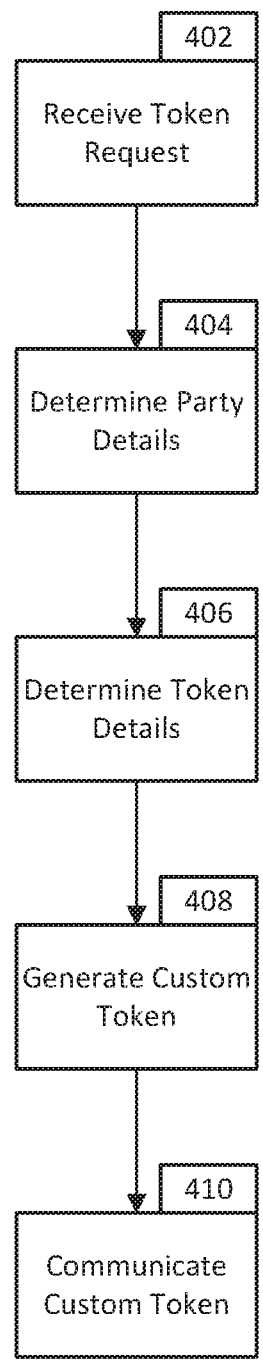
FIG. 4 is a flowchart showing another example of operations performed by a rule-based token service provider system according to an embodiment of the disclosure.

FIG. 4 is a flowchart showing another example of operations performed by a rule-based token service provider system according to an embodiment of the disclosure. Similar to block 302, a token request that includes token context data may be received in block 402.

After the token request has been received, details and preferences of the parties may be determined in block 404. For example, the token context data may identify the customer/user and/or the merchant. One or both parties may include preferences stored with the transaction management system and the transaction management system may determine details and preferences of the parties after the customer/user and/or merchant has been identified.

For example, the customer/user may prefer payment transactions in a first country to be conducted with a first payment vendor to maximize points earned and may prefer payment transactions in a second country to be conducted with a second payment vendor to minimize foreign transaction fees. Furthermore, the merchant may prefer payment transactions to be conducted with a third payment provider to minimize transaction fees paid to the payment provider. Also, the merchant may require that the token satisfy a minimum security level.

Such preferences may be used to determine token details in block 406. Determining the token details may be similar to determining the token parameters in block 304. In certain embodiments, the party details may specify certain characteristics of the token. Such details may specify characteristics of the token that are required, such as, for example, that the merchant requires a specific authentication technique utilizing a specific cryptogram technique. Other details may be used as factors in determining characteristics of the token, but may not specify such characteristics (e.g., user preferences may be used by the rules engine when determining characteristics of the token). Such factors may be weighted to determine details of the custom token. Once the token details are determined in block 406, the custom token may be generated in block 408 and communicated in block 410.

Figure 5:
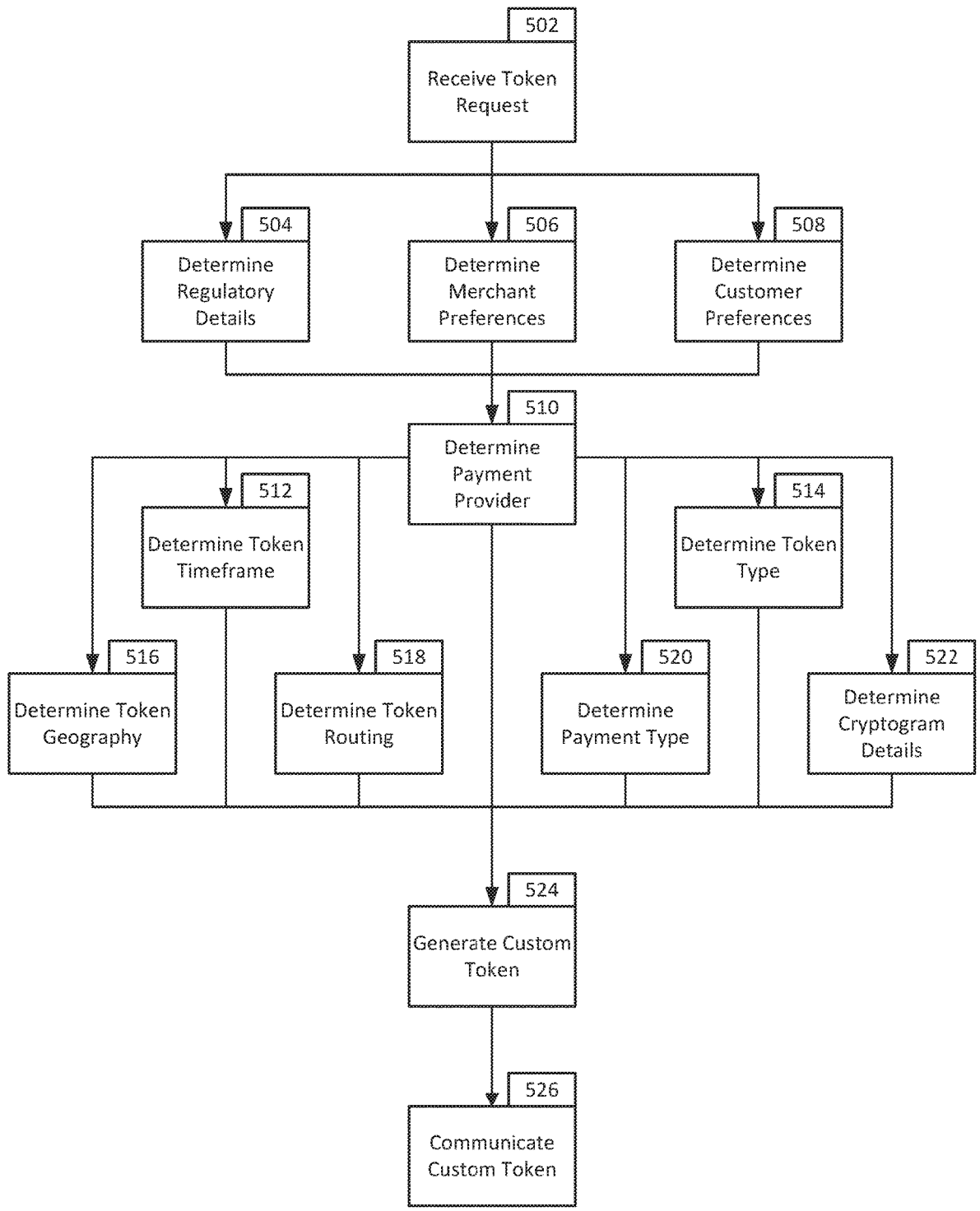
FIG. 5 is a flowchart showing another example of operations performed by a rule-based token service provider system according to an embodiment of the disclosure.

FIG. 5 is a flowchart showing another example of operations performed by a rule-based token service provider system according to an embodiment of the disclosure. Similar to block 302 and 402, a token request that includes token context data may be received in block 502.

Based on the token context data, regulatory details, merchant preferences, customer/user preferences, and/or other parameters of the token may be determined in blocks 504, 506, and 508, respectively. For example, the token context data may include data directed towards a transaction location, transaction type, or parties of the transaction. The regulatory details may be determined from such data. Thus, transactions that occur in a first country may require a first token format, while transactions that occur in a second country may require a second token format. For example, certain locations (e.g., countries) may require tokens that utilize a first authentication format (e.g., a 20 byte TAVV cryptogram) while other locations my require tokens that utilize a second authentication format (e.g., CVC2). Block 504 may determine authentication formats available in the transaction location, merchant location, and/or customer location.

Merchant preferences may be determined in block 506. Merchant preferences may be determined from the token context data and may include preferences related to funding sources, any co-branding agreements (e.g., whether the merchant will receive points or incentives for certain transactions), whether open or closed loop tokens are preferred, monetary limits to the transaction or the token, preferences for a period of validity of the token, preferred currency, the location of the merchant, whether the token is to be used for an online (e.g., authenticated and performed by a merchant device while connected to a server) or offline transaction, payment schemes (e.g., debit, credit, prepaid, as well as any routing preferences), the type of merchant or goods, any security features needed, the amount of transaction, specific times for routing, and other preferences.

The merchant preferences may, for example, include preferences for a particular Bank Identification Number ("BIN") routing or routing scheme. For example, certain merchants may only support specific banks or token issuers. In such an embodiment, the merchant preference may note that the specific banks or token issuers and the custom token generated in block 524 may, for example, be an open loop token usable by one or more of the specific banks or token issuers. For example, a merchant may only accept payment via American Express® and so the merchant preference may indicate that the token must be an open loop token for American Express®. As another example, a merchant may offer a private label credit card ("PLCC") and the merchant preference may indicate that the merchant prefers, but does not require, a token associated with the PLCC.

Customer preferences may be determined in block 508. Customer preferences may include one or more of the preferences listed for the merchant above, but in the context of the customer. Thus, customer preferences may include funding source preferences, monetary limits to the transaction or accounts associated with the customer, preferences for a period of validity of the token, preferred currency, customer location, the type of token (e.g., whether for online or offline transactions), payment schemes (debit, credit, prepaid, any routing preferences), goods involved in the transaction, minimum security required, the amount of transaction, and other preferences.

Customer preferences determined from the token context data may determine or affect the scope of the token. For example, the customer may specify a funding plan or indicate a preference for a specific funding plan. The preferences may, accordingly, indicate that the customer preference requires or prefers tokens with specific BINs (e.g., BINs associated with PLCC to increase customer point accumulation) or that the token requires indication that the customer is associated with a specific credit card. In another example, if the customer preference indicates that the customer possesses a gift card, the token may indicate that the gift card should be used for part or all of the payment. In certain embodiments, payment may be divided between the gift card and a credit card may be configured to indicate that a portion of the payment is to be routed via the gift card and another portion routed via the credit card. Other embodiments (such as when a closed loop token is used) may configure the token to indicate that all of the payment is first routed through the third party payment provider before charging the gift card and the credit card. How specific aspects may be determined may be further described herein.

The details and preferences described for one party in blocks 504 to 508 may, in certain embodiments, be determined or indicated by another such party. Thus, customer preferences described in block 508 may, in another embodiment, apply similarly as a merchant preference. Furthermore, other embodiments may include business considerations or rules associated with one or more parties such as the customer or the merchant, or with the transaction management system itself Such business rules may be rules that save on costs, increase points, or allow for increases in the number of transaction processed.

Additionally, such rules may be directed to risk. Thus, for example, the risk profile (e.g., risk of fraud, default, loss of device, or other such risk) of a merchant and/or customer can be determined. Different types of tokens may be selected depending on the risk profile of the merchant and/or customer. Thus, if for example, a customer is determined to have a higher risk of fraud (e.g., other entities may be more likely to pose as the customer), tokens with more stringent security features (e.g., more complicated cryptograms or a requirement for the user to verify their identity) may be selected. Likewise, if the customer is determined to have a lower risk of fraud, tokens with less strict security features that allow for faster processing may be selected.

The details and preferences determined in blocks 504 to 508, as well as other parameters (e.g., preferences of the payment provider), may be used to determine aspects of the token in blocks 510 to 522. Blocks 510 to 522 may determine specific aspects or weights that are used in generation of the token. Specific aspects may denote a hard requirement for the token (e.g., the token type may be a hard requirement and may require that the token is an electronic token). Other aspects of the token may be determined through weighting of certain aspects. In certain embodiments, the aspects of the token that are determined through weighting and are not specific hard requirements may be determined along with one or more other aspects through the use of pre-determined rules. Thus, for example, the payment provider and the merchant may have different preferences for token routing, but no hard requirements. Token routing may then accordingly be determined based on certain aspects such as, for example, network traffic on the various routing paths, cost of the routing paths to the merchant, location of the merchant, any needed token timeframes (e.g., if the token is configured for a specific timeframe and payment networks for a first payment provider are scheduled to be down during that timeframe, the token may be configured to a second payment provider to avoid possible down time), and other factors.

In certain situations, the token may be generated and communicated before a specific transaction has been determined. In such a situation, the token may be configured to be used in different areas. As the optimal or allowable (e.g., due to regulations) payment providers or routing paths may differ from location to location, the token may be associated with multiple payment providers and configured to include multiple routing paths and, if the token is used in a location that does not allow for a first routing path or payment provider, the token may instead utilize a second routing path or payment provider instead.

For example, the payment provider may be determined in block 510. Preferences related to specific payment providers, BINs, authentication techniques, and other parameters may affect determination of the payment provider. For example, the regulatory details may specify that only authentication techniques that utilize certain cryptograms may be used in the country that the transaction occurs and so only payment providers that support such cryptograms may be possible payment providers. Cryptogram details may be further described in block 522. The merchant preference may then indicate that the merchant can only receive payment from two of the payment providers. The customer preference may indicate that the customer receives points from three payment providers, but only one of those payment providers satisfies both the regulatory details and the merchant preference as well. Thus, the payment provider of the custom token may be that one payment provider.

In certain embodiments, the transaction management system may receive data on the status of various payment providers that may possibly be selected in response to the regulatory details, merchant preferences, and customer preferences. Such data may include status of the payment networks of the payment providers. For example, whether the payment network is operational or not may be indicated. Additionally, the level of traffic on the payment networks may also be indicated. Thus, for example, the transaction management system may be configured to not select payment providers whose payment networks are not operational. The transaction management system may also more favorably weight payment providers whose payment networks have a level of traffic below a threshold level, to improve transaction processing speed.

In certain embodiments, such as when tokens are open loop tokens, a plurality of payment providers may be determined and the generated token may be compatible with each of the plurality of payment providers. For such a token, a payment provider order may be specified and indicated on the generated token.

In block 512, a timeframe (e.g., period of validity) of the token may be determined. In certain areas, the regulatory scheme of the area may specify a period of validity and, thus, the timeframe of the token in such an example is accordingly determined by regulations. Alternatively, merchant or customer preferences may set the timeframe of the token or be a factor in determination of the timeframe. For example, the merchant preference or customer preference may specify that tokens associated with the merchant or customer, respectively, should have a specific timeframe of validity or have a timeframe of validity within a range of time. The token's timeframe of validity may then accordingly be that specific timeframe or within the range. Thus, for example, the token context data may specify that the transaction is scheduled to occur at a specific time or timeframe and the token may thus be configured to accommodate the scheduled transaction time. Additionally or alternatively, the payment provider may specify a specific timeframe or a period of validity.

In block 514, a token type may be determined. The token type may include electronic tokens (e.g., tokens transmitted electronically via, for example, NFC, Bluetooth, or another network), visual tokens (e.g., tokens that are configured to be scanned by presenting on a screen of the user or merchant device or printed), or other types of tokens. The token type may be determined from one or more of the regulatory details, merchant preferences, customer preferences, and/or other factors (e.g., certain payment providers may support only certain payment types and, thus, the token type may be limited accordingly to the payment provider). Thus, for example, the merchant or customer may specify that the token is to be an electronic token.

The token type may also indicate that type of transaction that the token will be utilized for. Types of transactions may include payment transactions, physical actions, contextual uses, and other types. Payment transactions may include credit, debit, gift card, and other payment types and the token in such payment transactions may include information directed towards one or more specific payment cards (e.g., PLCCs), banks, or point accounts for the transaction. Physical actions may include tokens that identify the user to, for example, allow access to hotels, gyms, cars, or other environments. Accordingly, a user may request a token for a rental property or car and the token may accordingly be generated and communicated to the user. Contextual uses may include tokens that contain information (e.g., addresses or other information). The information may be contained within the token and the token may be scanned to access the information. Thus, a user may request tokens for a variety of uses, and the token context data may specify the use of each token request. The transaction management system may determine the use from the request and generate the appropriate token. In certain embodiments, a token may be configured for two or more different types of uses.

In block 516, the token geography (e.g., the geographical limits of the token) may be determined. The token geography may denote an area where, if the token is used within the area, the token is valid and where, if the token is used outside the area, the token is invalid.

In block 518, token routing may be determined. Token routing may determine the routing path of payment transactions that utilize the token. In certain embodiments, token routing may be determined according to regulatory details, merchant preferences, and/or payment provider preferences. For example, the regulatory details of certain areas may require certain payment routing or the payment provider may specify certain routing. Additionally or alternatively, the merchant may prefer an open loop token or a closed loop token. For open loop tokens, payment routing may be according to preferences of the payment provider. However, for closed loop tokens, payment may first be routed through the third party payment provider before being charged against the ultimate account (e.g., payment may first be routed through PayPal® and PayPal® may then charge the credit card account, gift card, debit account, or prepaid account of the customer).

In certain embodiments, the custom token may specify a plurality of payment routing paths. The routing paths may, for example, change on a daily or hourly basis (e.g., based on rates that may, for example, change due to total value payments as well as other concessions that may vary). Thus, for example, the transaction management system may generate closed loop tokens that specify that, when the token is used in a payment transaction, payment is first processed through the transaction management system itself The token may include data indicating that the token is associated with a plurality of routing paths. Once the transaction management system receives the token (e.g., to process payment for a transaction), the transaction management system then attempts to receive data from the payment providers or the payment routing paths. From the data, the transaction management system then selects a payment routing path by balancing one or more of I) the payment processing time, 2) the cost of routing, 3) whether the routing path supports payments for the items of the transaction and/or the amount of the transaction, 4) incentives earned through using the routing path, and/or other factors. In certain such embodiments, there may be a primary (preferred) routing path and a secondary (fallback) routing path. The secondary routing path may be used if the primary routing path is unresponsive (e.g., a payment attempted through the primary routing path may have failed or data may indicate that the primary routing path is offline) or unacceptably slow (e.g., the predicted payment processing time may be greater than a threshold timeframe).

In certain embodiments, the transaction management system may include appropriate agreements with payment and/or routing providers to minimize penalties for favoring one partner over the other. In such an embodiment, a customer/user or merchant may, accordingly, request a token from the TSP that may be associated with a plurality of payment and/or routing providers. As the TSP ultimately processes the token, the customer/user or merchant may thus receive the benefits of some or all agreements that the TSP has with the payment and/or routing providers without individual agreements with the payment and/or routing providers. Thus, the customer/user or merchant may gain advantages from using the service of the TSP.

In block 520, a payment type may be determined (e.g., whether the payment is a credit, debit, prepaid, gift, or other type of payment). The customer preference may, for example, denote the payment type based on accounts available to the customer and/or based on customer or merchant preferences.

In block 522, cryptogram details may be determined. Cryptogram details may be determined according to, for example, regulatory details, merchant preferences, customer preferences, payment provider preferences, or other factors. For example, certain countries may include regulatory requirements for cryptograms. Payment providers may, likewise, offer different cryptogram techniques for different areas.

Thus, for example, the transaction management system may determine, from the merchant preferences that the merchant prefers Visa® or MasterCard® as a payment provider. The payment network of Visa® may indicate high traffic, while the payment network of MasterCard® may indicate normal processing traffic. Thus, the transaction management system may select MasterCard® as the payment provider. The transaction management system may then determine a location of the transaction as MasterCard® may include payment provider preferences that vary depending on the country of the transaction and the merchant status.

For example, for merchants that are Digital Secure Remote Payments ("DSRP") enabled and within the United States, MasterCard® may specify a UCAF compatible token. For merchants within the United States that are not DSRP enabled, MasterCard® may specify that a Discover® compatible token with a card verification value ("CVV") be provided instead. Outside of the United States, MasterCard® may not support merchants who are not DSRP enabled. In such a situation, the transaction management system may generate a Visa® token instead. If the merchant is DSRP enabled, a MasterCard® UCAF compatible token is provided.

Other examples may offer tokens of other types depending on the payment provider. Thus, for example, if a Visa® token is determined to be provided, merchants that can accommodate Token Authentication Verification Value ("TAVV") cryptograms may be provided with a Visa® TAVV token. For merchants that cannot accommodate TAVV cryptograms, the transaction management system may provide generate and/or provide a token with a dCVV cryptogram instead.

Cryptograms can be generated and/or processed through different techniques. In certain examples, the cryptogram techniques described herein can be applied to tokens generated and/or processed with techniques related to or utilizing host card emulation, secure elements, trusted execution environments, and/or other such techniques. In an example technique, certain cryptograms can be generated and validated through pre/post fetch techniques. In a pre/post fetch technique, a token and/or transaction can be validated through communicating and solving the cryptogram associated with the token before a transaction has been conducted or after the transaction has been performed. Such a technique can, for example, generate a token that is configured to communicate the cryptogram to a payment provider or the token service provider when a triggering event is detected. For example, such a trigger event may be when the token requestor is determined to be within a store, at a check out register, visiting a merchant website, and/or performing another action indicating that a transaction may be imminent. Upon detection, the cryptogram (and, thus, the token) may be validated in preparation for the transaction.

In some embodiments, the electronic device of the user can be configured to determine that the device is exiting a first area. The first area may be, for example, a state, country, or other area where allowed cryptogram techniques vary from other areas. Upon detection that the user is exiting the first area, the electronic device can communicate the cryptogram for "pre-solving" to thus pre-validate the token and, accordingly, allow the token to be usable in another area where the cryptogram technique may not be allowed or used. Such a technique may, accordingly, take into consideration the compliance (e.g., regulatory) and logistical conditions of the destination of travel. In other words, the technique described allows for tokens and/or electronic devices utilizing the tokens to be utilized in areas where compliance and logistics would typically render usage of such tokens challenging.

In other embodiments, the cryptogram of the token can be configured to be validated after a transaction has been initiated or performed. Thus, the user can initiate a transaction and the electronic device can then communicate the cryptogram for validation. The transaction may not be fully completed until the cryptogram has been validated or the transaction may be refunded if validation of the cryptogram has failed.

In a certain example, cryptograms may be validated with a combination of parties. For example, such a process may involve a token service provider, a payment provider, and a user that may be a merchant or customer. The cryptograms may be validated through the use of associated cryptogram keys. In certain embodiments, such keys may be used to both generate and validate the cryptogram. The key used to generate the cryptogram will need to match the key used to validate the cryptogram. In various embodiments described herein, generation of the cryptogram and validation of the cryptogram may be performed via one party or a plurality parties with matching keys.

In a certain embodiment, the token service provider and the payment provider may each possess cryptogram keys for writing and/or solving the cryptogram. The token service provider then generates the token with the cryptogram. The cryptogram may be generated with the cryptogram key. The token may then be communicated to the user and used in a transaction. During processing of the transaction, the token may be communicated to the payment provider. The payment provider can validate the token through solving of the cryptogram using the cryptogram key and, in response, process the transaction accordingly. Possession of separate cryptogram keys may allow for quicker processing of transaction as cryptograms of tokens can be validated directly by the token service provider and/or the payment provider.

In certain other embodiments, the token service provider may receive a token request and generate the token. The token service provider may request a cryptogram from the payment provider and the payment provider may accordingly generate the cryptogram and transmit the cryptogram to the token service provider for incorporation into the token. The token can then be used in a transaction and validated as described herein. Such an embodiment may allow for the payment provider to have complete control over generation of the cryptogram and over the cryptogram keys. In certain such embodiments, the payment provider may, for example, locate an electronic device within a facility of the token service provider. Such a location may allow for quick generation of cryptograms, avoiding lag times inherent in requesting cryptograms over long distance networks.

In certain embodiments, the token can be configured to utilize multiple different cryptogram techniques described herein, depending on the situation detected. Thus, for example, a token service provider may typically use a first technique when a token is requested for an ongoing transaction. However, if the token service provider determines that the user is requesting a token for an overseas transaction, the pre-validating technique may be used instead.

Additionally, the transaction management system may support other token types and/or generate CVV or another cryptogram styles for the other token types. CVV may be selected for merchants and/or transactions located within the United States, while, for example, Gemalto may be selected for merchants and/or transactions located outside the United States.

In block 524, the custom token may be generated according to the details and preferences determined in blocks 504 to 508, aspects determined in blocks 510 to 522, and/or other parameters. The custom token may then be communicated in block 526 to the merchant and/or the customer.

Figure 6:
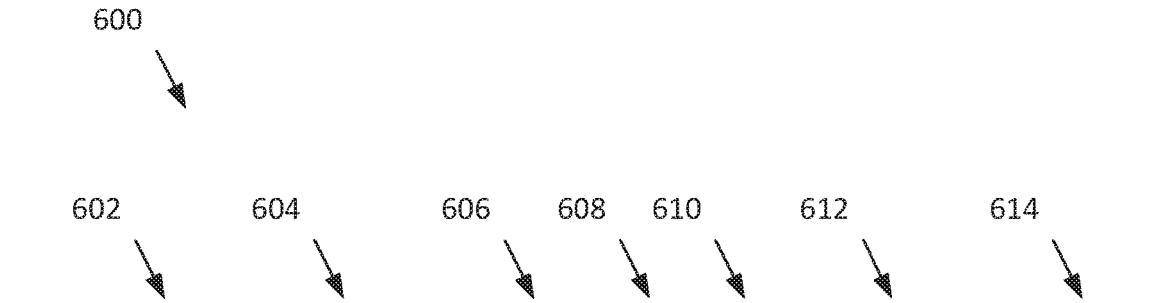
FIG. 6 is a representation of an example database structure used for a rule-based token provider system according to an embodiment of the disclosure.

FIG. 6 is a representation of an example database structure used for a rule-based token provider system according to an embodiment of the disclosure. Database 600 of FIG. 6 may include columns 602-614.

Column 602 may indicate a cryptogram preference (e.g., of the payment provider, the merchant, and/or the customer). The cryptogram preference may be determined from the token context data and/or stored preferences. In certain embodiments with preferences by two or more parties, the preferences may be weighted to arrive at preferred and backup preferences.

Column 604 may indicate locations that a token may be used at. In certain embodiments, the location may affect the cryptogram technique used by the token. Column 606 may indicate a payment provider for the token. Columns 608 and 610 may indicate back up options. For example, column 608 may indicate back up payment providers and column 610 may indicate whether any merchant preferences were overridden by payment provider rules.

Column 612 may indicate primary cryptogram techniques that the token is compatible with. Tokens may be compatible with one cryptogram technique, or a plurality of cryptogram techniques (to increase versatility of the token). The primary cryptogram technique may be techniques that are first used when processing a transaction utilizing the token. Column 614 may indicate secondary cryptogram techniques that the token is compatible with. The secondary cryptogram technique may be techniques that are fallbacks should the primary cryptogram technique fail.

Figure 7A:
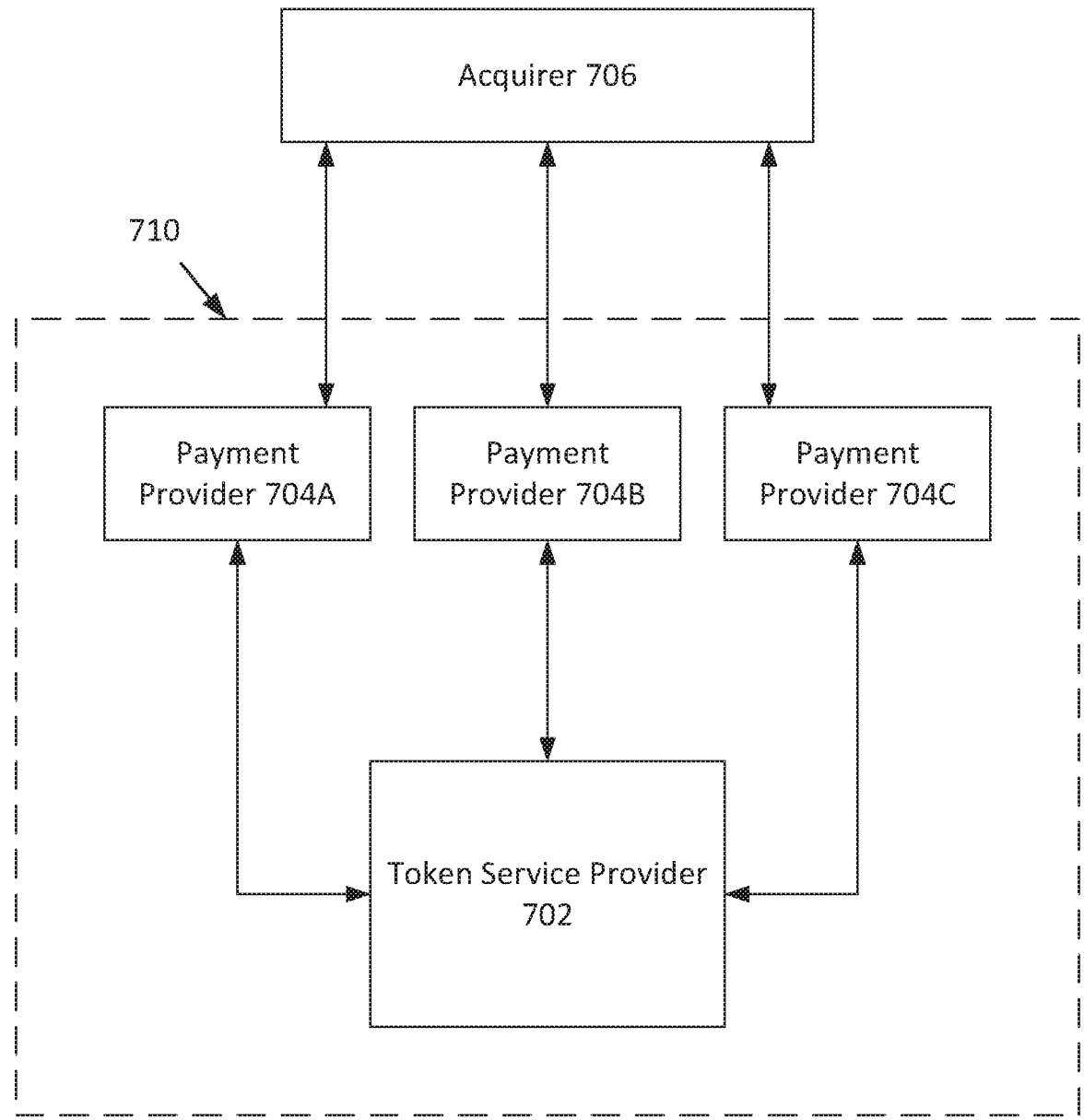
FIG. 7A is a block diagram showing an example token serving system according to an embodiment of the disclosure.

FIG. 7A is a block diagram showing an example token serving system according to an embodiment of the disclosure. In FIG. 7A, token service provider 702 may be a token service provider as described herein. Token service provider 702 may be associated with a plurality of payment providers, such as payment providers 704A-C. Token service provider 702 may be configured to provide tokens in response to a token request from acquirer 706. Acquirer 706 may be, for example, a merchant or a customer.

In FIG. 7A, token service provider 702 may receive a token request from acquirer 706. In response, token service provider 702 may provide a token associated with one or more payment providers 704A-C. The token service provider 702 may select one or more of payment providers 704A-C based on the token request. As shown in FIG. 7A, payment providers 704A-C may share a token pool 710. That is, token pool 710 may include a population of tokens and each of the tokens within the population may be shared with the various payment providers. Thus, payment providers 704A-C may share token formats and process transactions using the shared token formats.

In certain embodiments, token pool 710 may include tokens that may be re-issued. Accordingly, each token (which may include an associated token payment account number) may be issued, used in a transaction, and re-issued. Thus, token pool 710 may include a significantly smaller number of tokens than accounts maintained by payment providers 704A-C as the tokens can be continuously reused. The smaller number of tokens may allow for processing memory savings and easier management by electronic systems.

In certain embodiments, token service provider 702 may receive a token request, select one or more payment providers 704A-C suited according to the token request, and write a token from the population of token pool 710 associated with the selected one or more payment providers 704A-C. In certain such embodiments, the selected one or more payment providers 704A-C may be identified within the written token. In situations where the token identifies more than one payment provider 704A-C, the customer, merchant, and/or token service provider 702 may determine an appropriate payment provider 704A-C to use to process the transaction.

Figure 7B:
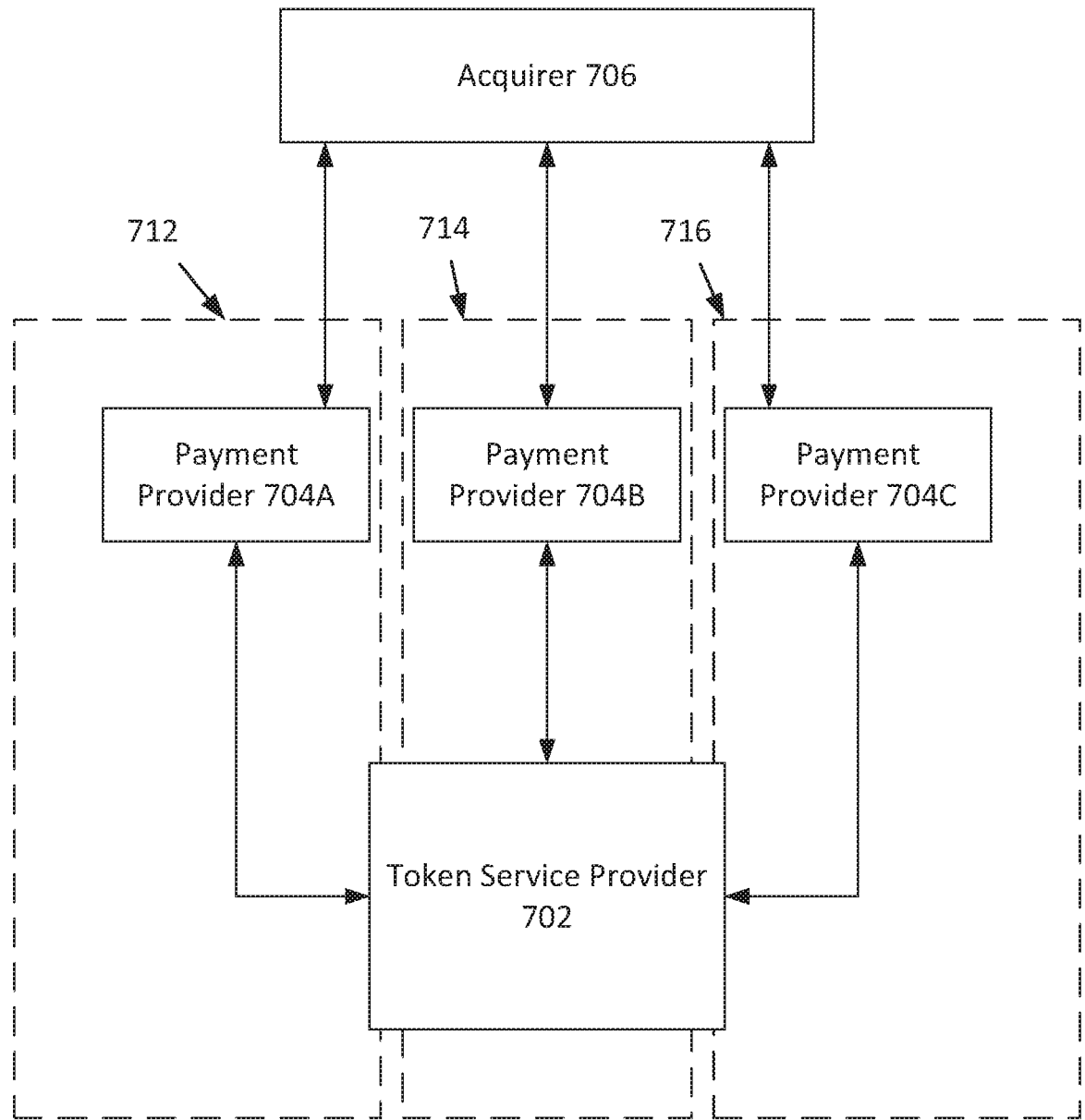
FIG. 7B is a block diagram showing another example token serving system according to an embodiment of the disclosure.

FIG. 7B is a block diagram showing another example token serving system according to an embodiment of the disclosure. In FIG. 7B, token service provider 702 may be a token service provider as described herein and may be associated with a plurality of payment providers 704A-C. Token service provider 702 may be configured to provide tokens in response to a token request from acquirer 706 by determining an appropriate payment provider. In the embodiment shown in FIG. 7B, each of payment providers 704A-C may have their own unique token population. For example, payment provider 704A may be associated with token pool 712, payment provider 704B may be associated with token pool 714, and payment provider 704C may be associated with token pool 716. Thus, the token format used by payment provider 704A may not be compatible with the token format of, for example, payment provider 704B.

When token service provider 702 receives a token request, token service provider 702 may select an appropriate payment provider. Token service provider 702 may then write or communicate with the selected payment provider to provide the appropriate token to acquirer 706.

Figure 7C:
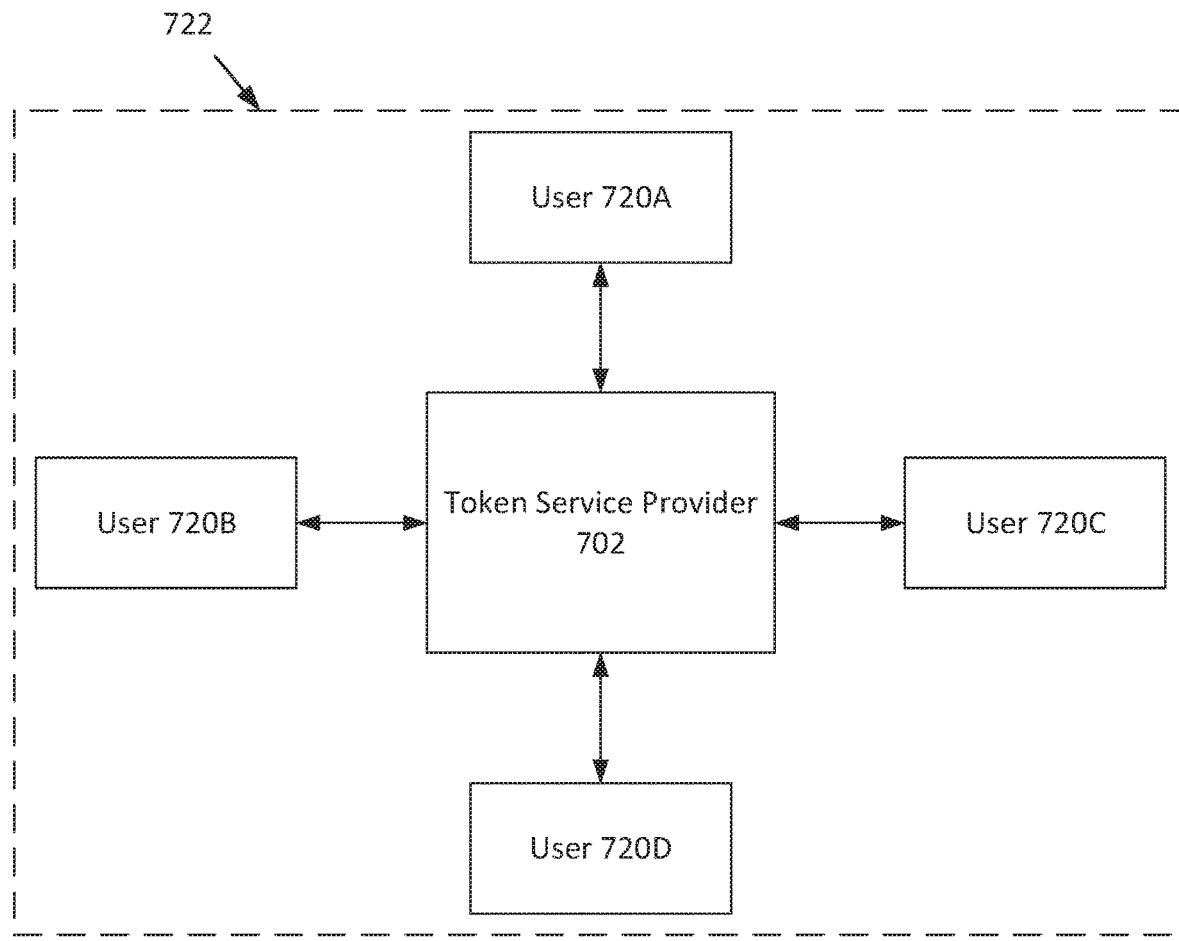
FIG. 7C is a block diagram showing a further example token serving system according to an embodiment of the disclosure.

FIG. 7C is a block diagram showing a further example token serving system according to an embodiment of the disclosure. FIG. 7C illustrates an embodiment where users 720A-D (e.g., merchants and/or consumers) are a part of token pool 722. In the embodiment of FIG. 7C, users 720A-D are configured to utilize a specific token configuration associated with token pool 722. The token configuration is compatible with each of users 720A-D so that a token from token pool 722 may be used in a transaction with any of users 720A-D. Thus, token service provider 702 may provide a token to one of users 720A-D, or another user, and such a token may then be used in a transaction with users 720A-D.

Figure 8:
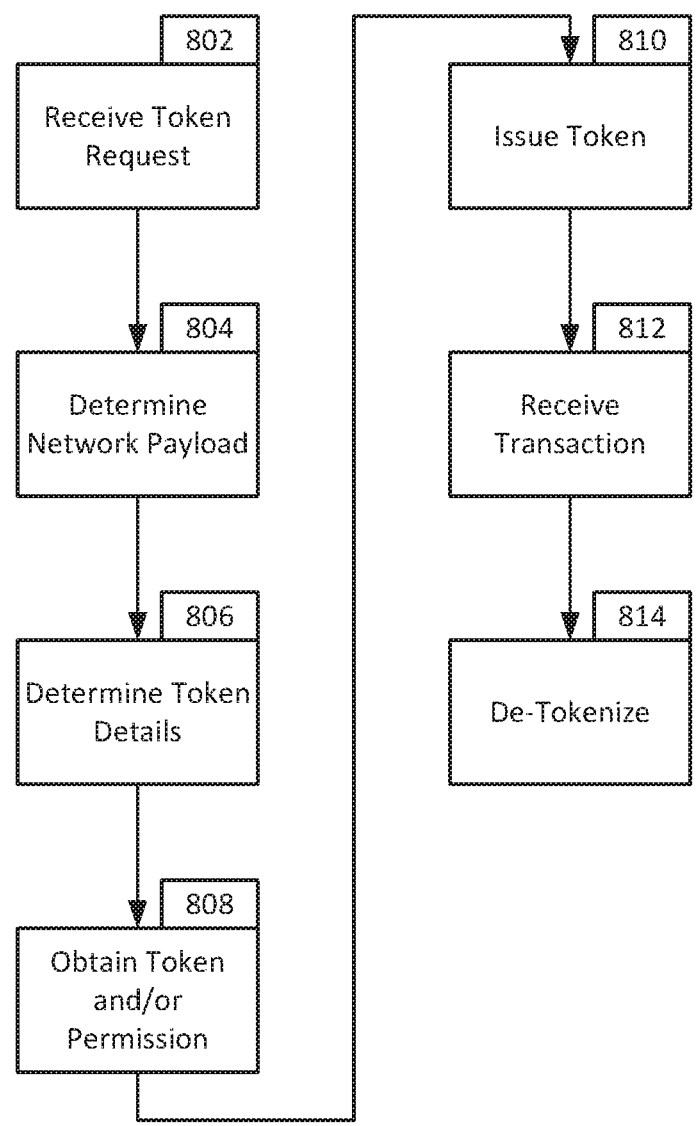
FIG. 8 is a flowchart showing an example of operations for a transaction performed using a token service provider system according to an embodiment of the disclosure.

FIG. 8 is a flowchart showing an example of operations for a transaction performed using a token service provider system according to an embodiment of the disclosure. In block 802, a token request, as described herein, is received by a token service provider. The token service provider may, for example, receive a request for a payment token that does not specify a specific payment provider and/or allows for associated with a number of payment providers.

After receiving the token request, the token service provider may determine network or token payload of various payment providers in block 804. The network payload may be determined by, for example, the token service provider checking or requesting network or token usage statistics for the payment providers. In response, in block 806, the token service provider determines the details of the token to be provided. Such details may include the identity of the payment provider, the acquirer, geographic limitations, transaction details, and other information.

In block 808, the token service provider may obtain permission from the payment provider to issue the token associated with the payment provider. After permission is obtained, the token is issued in block 810. In certain embodiments, the token may be provided to the payment provider, which then issues the token to the acquirer. In other embodiments, the token service provider may directly provide the token to the acquirer.

In block 812, the token may be used in a transaction. During a transaction, the token may be routed through the network used to provide the token and/or through another network. The token may be provided to the payment provider and/or the token service provider for validation (e.g., through confirmation of the cryptogram). In block 814, the payment provider and/or the token service provider may also de-tokenize the token (e.g., after validation in block 812) to determine payment information and other information from the token. The transaction may then be processed according from the de-tokenized information.

Figure 9:
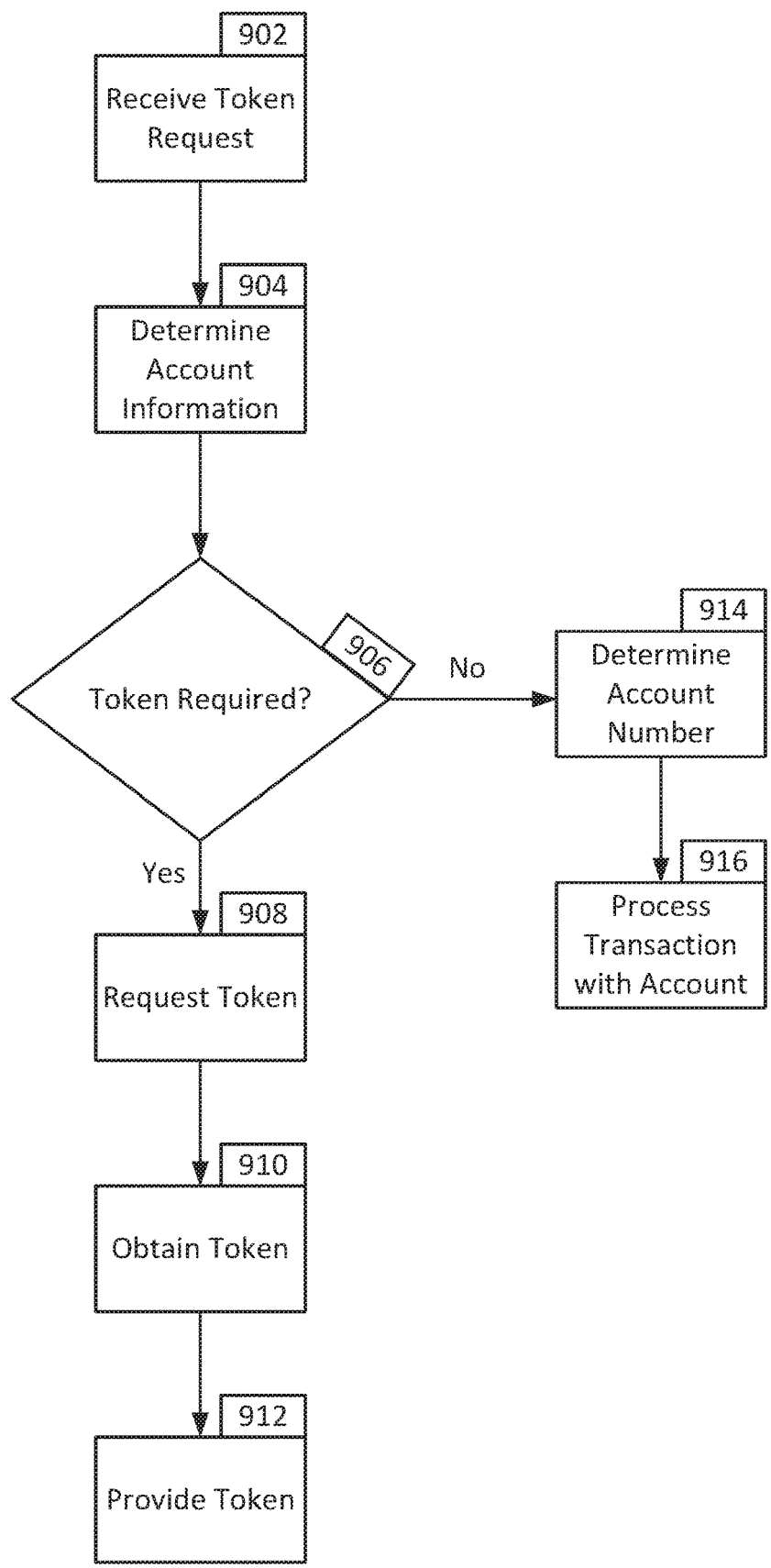
FIG. 9 is a flowchart showing another example of operations for a transaction performed using a token service provider system according to an embodiment of the disclosure.

FIG. 9 is a flowchart showing another example of operations for a transaction performed using a token service provider system according to an embodiment of the disclosure. FIG. 9 may illustrate a technique that allows for determination of whether a token is required for a transaction before a token is provided. In block 902, a token request is received from an acquirer (e.g., a merchant and/or customer).

In block 904, account information of the acquirer may be determined. For example, payment account information (e.g., payment account number, balance, and/or account restrictions) of a customer may be determined. The payment account information, as well as other information, may be used in block 906 to determine if a token is required. Thus, for example, if the payment account number of the acquirer is expired or is determined to expire in a timeframe less than a threshold timeframe, a token may be needed to allow for more flexibility. Furthermore, if the transaction is considered a high risk transaction (e.g., for an item or with a vendor with a history of fraud), a token may also be needed to allow for a more secure transaction.

If a token is determined to be needed in block 906, a token may be requested in block 908, obtained in block 910, and provided in block 912 as described herein. If a token is determined to not be needed in block 906, an account number associated with the acquirer is determined in block 914. The transaction may then be processed with the account number in block 916.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The various features and steps described herein may be implemented as systems comprising one or more memories storing various information described herein and one or more processors coupled to the one or more memories and a network, wherein the one or more processors are operable to perform steps as described herein, as non-transitory machine-readable medium comprising a plurality of machine-readable instructions which, when executed by one or more processors, are adapted to cause the one or more processors to perform a method comprising steps described herein, and methods performed by one or more devices, such as a hardware processor, user device, server, and other devices described herein.

What is claimed:

1. A system comprising:
   a non-transitory memory; and
   one or more hardware processors coupled to the non-transitory memory and configured to read instructions from the non-transitory memory to cause the system to perform operations comprising:
   receiving a token request associated with a transaction request, wherein the token request either fails to identify a token provider or identifies a first token provider from a plurality of token providers;
   determining context data associated with the transaction request;
   determining, from the plurality of token providers, a second token provider for the transaction request based on the context data;
   selecting, from a plurality of authentication protocols, a particular authentication protocol that comprises a cryptogram protocol for the token request based on at least one of the context data or the second token provider;
   generating a token based on the particular authentication protocol and a token rule associated with the token request; and
   processing the transaction request based on the token, wherein the token is validated without validating any token provider identified in the token request.

2. The system of claim 1, wherein the token request identifies the first token provider, and wherein the operations further comprise:
   determining that the first token provider is incorrectly identified in the token request; and
   validating the token without validating the first token provider.

3. The system of claim 1, wherein the processing of the transaction request includes transmitting the token to the second token provider.

4. The system of claim 1, wherein the token is an open loop token that indicates a user consent to conduct a transaction associated with the transaction request.

5. The system of claim 1, wherein the processing the transaction request is further based on customer and transaction identification information associated with the transaction request.

6. The system of claim 1, wherein the operations further comprise determining a set of parameters for the token based on a geo-fence.

7. The system of claim 1, wherein the token is an open loop token.

8. A method comprising:
   receiving a token request associated with a transaction, wherein the token request either identifies no payment providers or identifies a first payment provider from a plurality of payment providers;
   determining, by a computer system, context data associated with the transaction;
   determining, by the computer system and from the plurality of payment providers, a second payment provider for the transaction based on the context data;
   selecting, from a plurality of authentication protocols, a particular authentication protocol that comprises a cryptogram protocol for the token request based on at least one of the second payment provider or the context data;
   generating, by the computer system, a token based on the particular authentication protocol; and
   processing the transaction based on the token, wherein the token is validated without requiring any payment provider identified in the token request to be validated.

9. The method of claim 8, wherein the token request identifies the first payment provider, and wherein the method further comprises:
   determining that the first payment provider is incorrectly identified in the token request; and
   validating the token without using the token first payment provider.

10. The method of claim 8, wherein the processing of the transaction includes transmitting the token to the second payment provider.

11. The method of claim 8, wherein the token is an open loop token that indicates a user consent to conduct the transaction.

12. The method of claim 8, wherein the processing the transaction is further based on customer and transaction identification information.

13. The method of claim 8, further comprising:
    determining a scope of the token based on a geo-fence.

14. The method of claim 8, wherein the token is an open loop token.

15. A non-transitory machine-readable medium having stored thereon machine-readable instructions executable to cause a machine to perform operations comprising:
- receiving a token request associated with a transaction, wherein the token request either provides no indications of a token provider or indicates a first token provider from a plurality of token providers;
- determining context data associated with the transaction;
- determining, from the plurality of token providers, a second token provider for the transaction based on the context data;
- selecting, from a plurality of authentication protocols, a particular authentication protocol that comprises a cryptogram protocol for the token request based on at least one of the second token provider or the context data;
- generating a token based on the particular authentication protocol; and
- processing the transaction based on the token, wherein the token is validated without validating any token provider indicated in the token request.

16. The non-transitory machine-readable medium of claim 15, wherein the token request indicates the first token provider, and wherein the operations further comprise:
- determining that the first token provider indicated in the token request is incorrectly identified; and
- validating the token without using the first token provider.

17. The non-transitory machine-readable medium of claim 15, wherein the processing of the transaction includes transmitting the token to the second token provider.

18. The non-transitory machine-readable medium of claim 15, wherein the token is an open loop token that indicates a user consent to conduct the transaction.

19. The non-transitory machine-readable medium of claim 15, wherein the processing the transaction is further based on customer and transaction identification information.

20. The non-transitory machine-readable medium of claim 15, wherein the operations further comprise determining a set of parameters for the token based on a geo-fence.

* * * * *

UNITED STATES PATENT AND TRADEMARK OFFICE
CERTIFICATE OF CORRECTION

PATENT NO. : 12,020,240 B2
APPLICATION NO. : 17/498640
DATED : June 25, 2024
INVENTOR(S) : Dinesh Agnello Gomes et al.

Page 1 of 1

It is certified that error appears in the above-identified patent and that said Letters Patent is hereby corrected as shown below:

In the Claims

Claim 9, Column 18, Line 54, change "without using the token first payment" to --without using the first payment--.

Signed and Sealed this
Nineteenth Day of August, 2025

Coke Morgan Stewart
*Acting Director of the United States Patent and Trademark Office*